Figure 1:
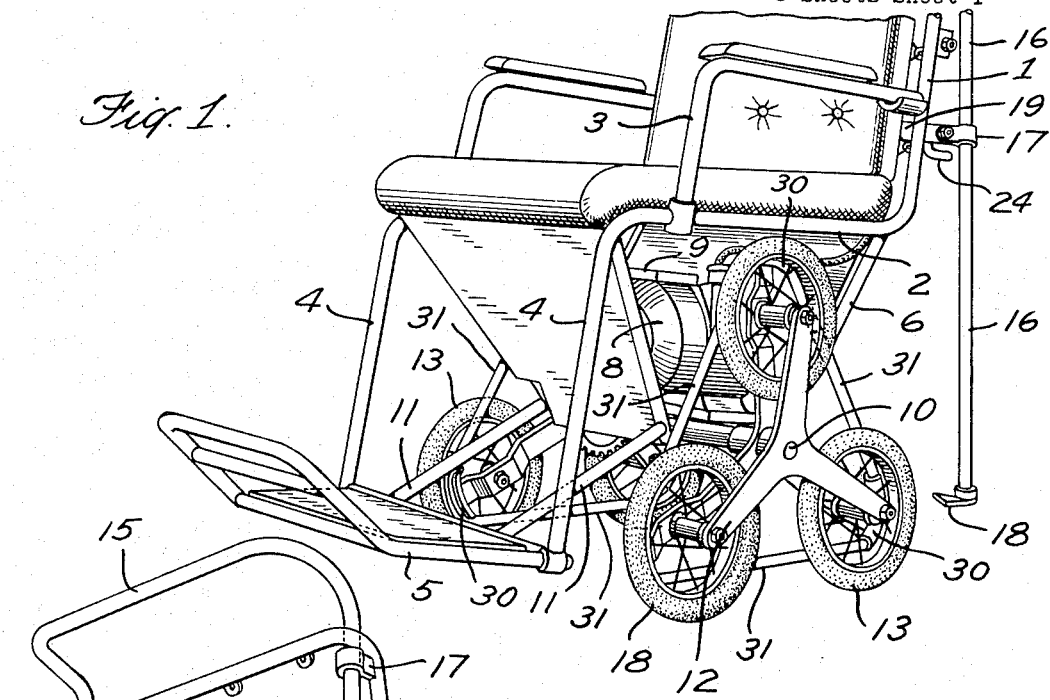

April 24, 1956  H. A. I. JOHANNESEN  2,742,973
POWERED INVALID CHAIR AND HANDLE CONTROL THEREFOR
Filed Jan. 28, 1953  3 Sheets-Sheet 1

April 24, 1956 H. A. I. JOHANNESEN 2,742,973
POWERED INVALID CHAIR AND HANDLE CONTROL THEREFOR
Filed Jan. 28, 1953 3 Sheets-Sheet 2

INVENTOR
HANS ARNE INGOLF JOHANNESEN
BY
ATTORNEY

April 24, 1956  H. A. I. JOHANNESEN  2,742,973
POWERED INVALID CHAIR AND HANDLE CONTROL THEREFOR
Filed Jan. 28, 1953  3 Sheets-Sheet 3
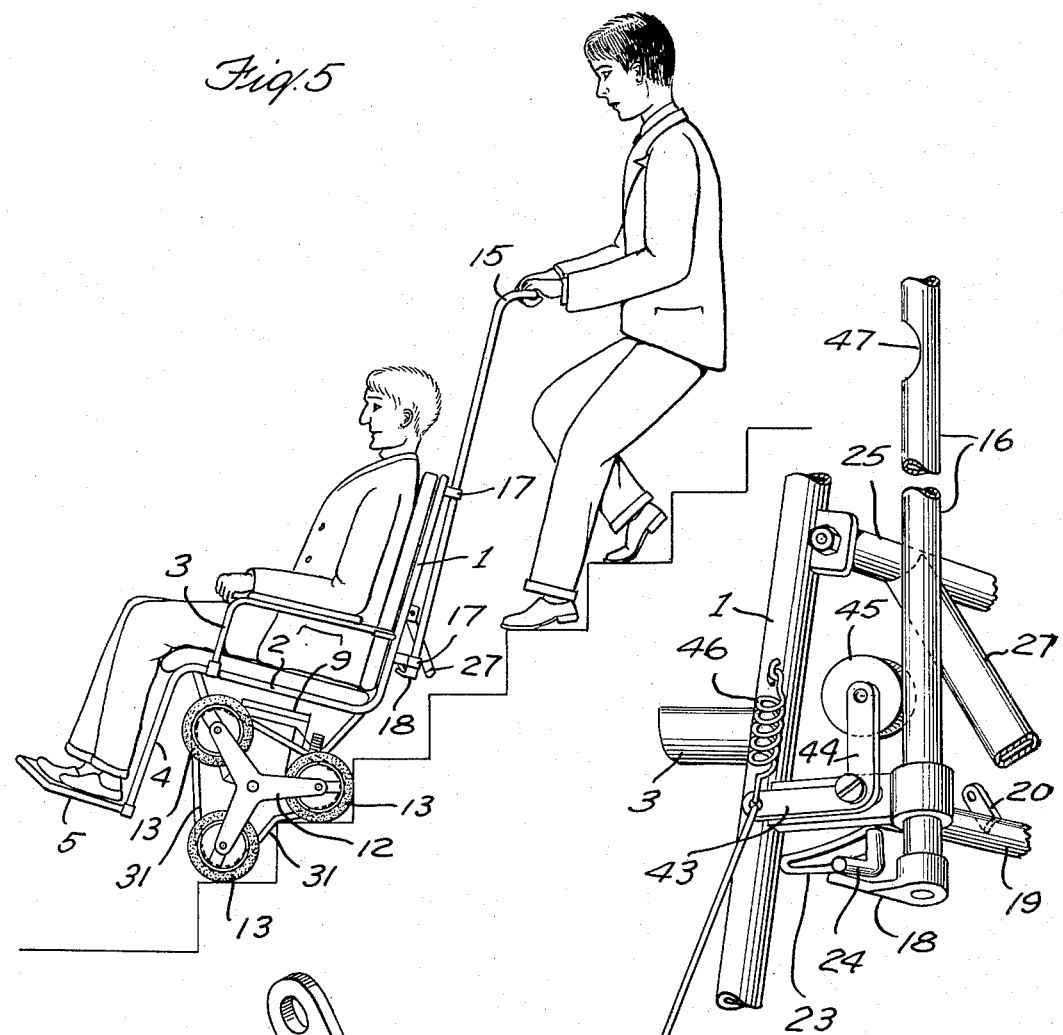
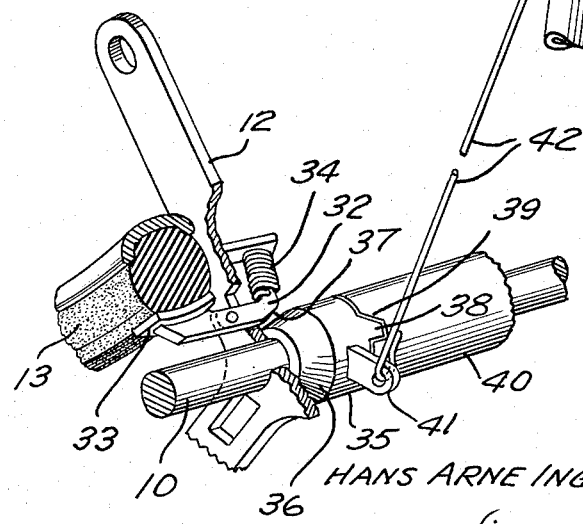
INVENTOR
HANS ARNE INGOLF JOHANNESEN
BY
ATTORNEY

United States Patent Office 2,742,973
Patented Apr. 24, 1956

2,742,973
POWERED INVALID CHAIR AND HANDLE CONTROL THEREFOR

Hans Arne Ingolf Johannesen, Klampenborg, Copenhagen, Denmark

Application January 28, 1953, Serial No. 333,810

Claims priority, application Denmark February 1, 1952

9 Claims. (Cl. 180—8)

The present invention relates to an invalid chair or like vehicle adapted to be wheeled up and down stairs and having on each side a set of three or more wheels mounted in arms secured in starlike formation to a common horizontal main shaft in such a manner that the wheels of the two sets are coaxial in pairs.

In the known vehicles of this type a special change over device is required for locking the main shaft when the vehicle shall run on a plane surface after having been wheeled up or down stairs. Said vehicles are only intended for goods transport and not for conveying invalid persons up and down stairs, because owing to the loosely rotatable main shaft they do not offer sufficient safety to be used for this purpose although two men must be used when the vehicle is wheeled up and down stairs.

The invention has for its object to produce an invalid or like vehicle of the type specified which does not require any change over from wheeling up or down stairs to running upon a plane surface and vice versa, and which may readily be operated by a single person.

According to the invention this problem has been solved by coupling the main shaft to a motor, preferably an electromotor, by means of a coupling which is so arranged that the main shaft is automatically locked when the motor is stopped so that one or two of said pairs of wheels may serve as running wheels when running upon a plane surface.

Thus the invention is based upon the idea of producing an invalid chair or like vehicle which is provided with a motor to be used when the vehicle is wheeled up or down stairs but which is normally pushed or pulled by hand when rolling on a plane surface.

According to the invention the coupling may preferably consist of a gearing which is self-locking in both directions of rotation.

To obtain the greatest possible safety for the invalid when vehicle is used as an invalid chair, and the greatest possible ease in operation, the invalid chair or vehicle may, according to the invention, be provided with a movable handle to guide the chair when wheeling up and down stairs, said handle being so arranged as to assume a neutral position when not operated and so connected to a switch for the electromotor that said switch is only closed, and the motor thereby supplied with current, when the handle is forced away from its neutral position. If the assistant guiding the chair should stumble or otherwise let go the handle during wheeling up or down staircase, the motor will stop immediately thereby locking the main shaft so that the chair will stand still on the staircase.

According to the invention it may be preferable to provide the handle at the upper end of rods approximately parallel to the back of the chair and so connected thereto as to be longitudinally displaced. When the chair shall run on a plane surface the handle will be in its lower position in normal height, and during wheeling on the staircase the handle will be drawn upwards so that the assistant need not bend but may assume an easy and natural position, the safety being thereby further increased.

Figure 2:
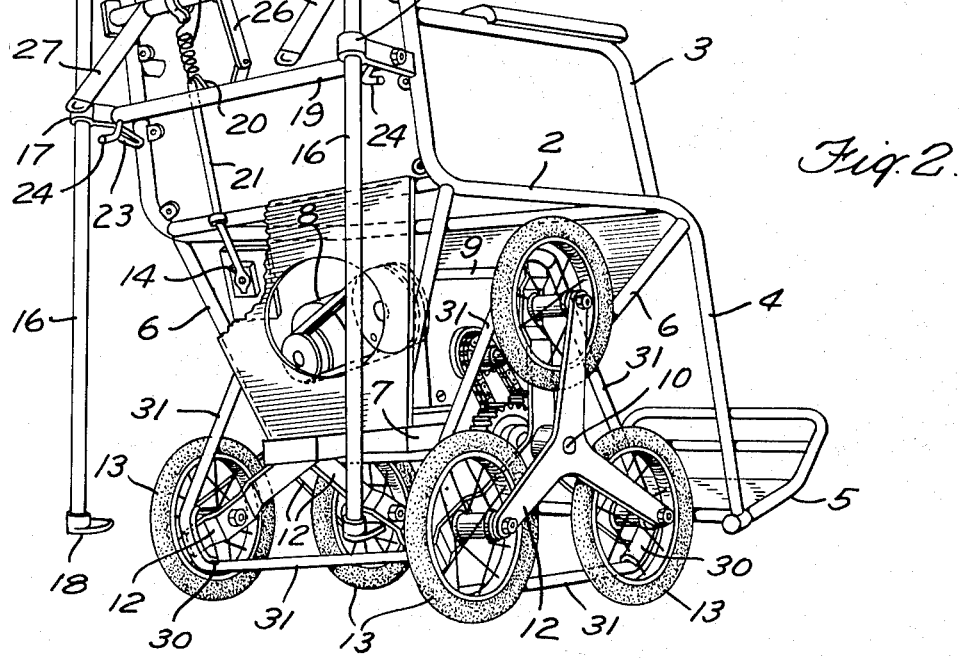
Figure 3:
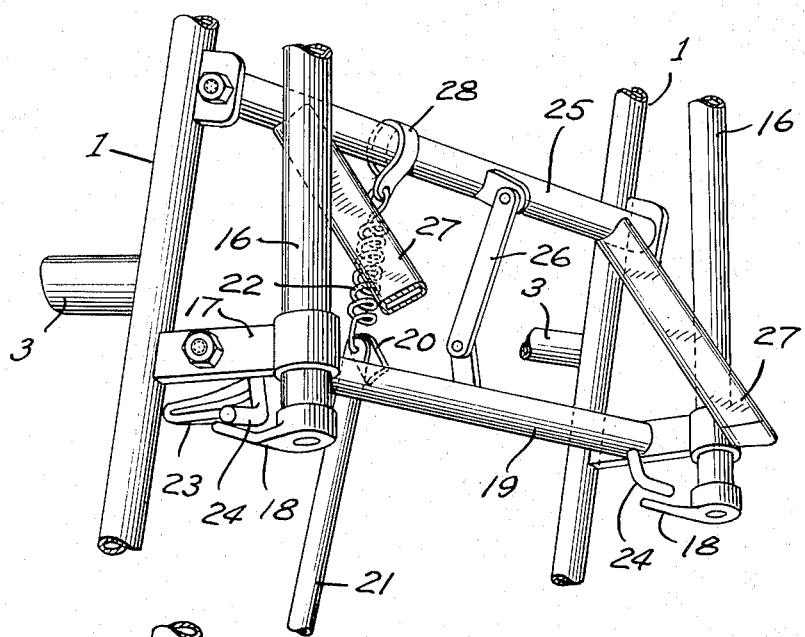
Figure 4:
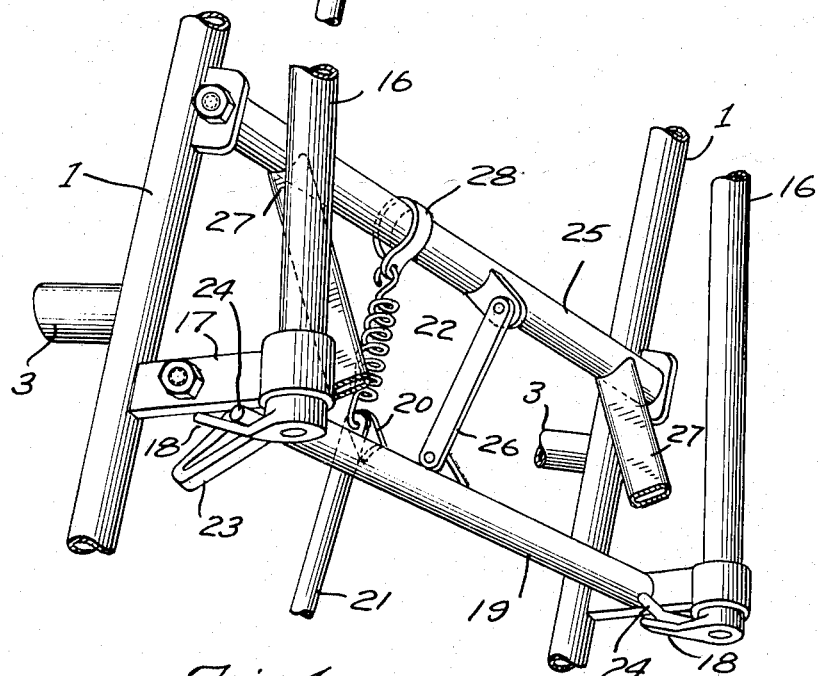

Further details of the invention will appear from the following description with reference to the drawings, in which Fig. 1 is a perspective front view of an embodiment of an invalid chair according to the invention, with the top portion of the back broken away, Fig. 2 a perspective rear view of the chair, Figs. 3 and 4 perspective views showing, among other things, the mechanism for operating a switch for an electromotor fitted inside the chair in the position assumed directly before closing the switch and in the position corresponding to closed switch, respectively.

Fig. 5 a side elevation of the chair on its way up or down a staircase, and

Fig. 6 a perspective view of a mechanism for braking the wheels when the chair is adjusted for wheeling up or down a staircase.

The chair shown in the drawings is built up on a frame having a back 1, a seat 2, an arm-rest 3, a descending front frame 4 and a footrest 5. Moreover, to the seat 2 a pair of descending side frames 6 are secured carrying at the lower end a bottom plate 7, Fig. 2, on which are mounted an electromotor 8 and a gearing 9, and bearings (not shown) for a main shaft 10. Furthermore, between the side frames 6 and the front frame 4 oblique bars 11, Fig. 1, are mounted. In the embodiment shown in the drawings the left arm-rest 3 is removable so that the invalid may be laterally moved into and out of the chair. Also the foot rest 5 is removably mounted. Through the gearing 9, which preferably is self-locking, the motor 8 is coupled to the main shaft 10. On the motor side the gearing 9 may preferably have a worm meshing with a worm wheel on the main shaft side. Spiders comprising three radiating bifurcated arms 12 angularly disposed at 120° are perpendicularly secured to each end of the main shaft 10. At the outer end of each fork a road wheel 13 is rotatably mounted, and the arms 12 are so arranged that two sets of road wheels are coaxial in pairs.

To start and stop the electromotor 8 a switch 14 is provided which may be mounted at any suitable place, but which for reasons to appear from the following in the embodiment shown in the drawings are placed on the back of the chair directly below the seat, Fig. 2.

For the purpose of being pushed forward the invalid chair has a handle 15 in the form of a backward bent strap continuing in two mutually parallel rods 16 the length of which approximately correspondings to the height of the chair and which extend approximately parallel to the back 1 of the chair by being led through lugs 17 secured to the back at the upper and lower ends thereof. Thus the rods may slide longitudinally in the lugs 17. At the lower end of the rods 16 projections 18 are mounted to limit the displacement of the rods.

When the above described chair shall be wheeled up a staircase, Fig. 5, it is run up to the staircase with the back facing the latter. Now the assistant takes a few steps upwards simultaneously pulling the handle 15 upwards into its upper position thereby rocking the whole chair somewhat backwards. Then the motor is switched in so that the main shaft 10 and the arms 12 secured thereto are set in slow rotation in the desired direction; the chair will thereby so to speak walk up the stairs. The slidable handle will allow the assistant to take up during the whole transport a comfortable and quite natural position affording the best possible conditions for a complete control of his own movements and those of the chair. When the stairs have been negotiated the motor is switched off and the handle pushed back to its neutral position. When the chair is to be wheeled downstairs the main shaft 10 must, of course, be made to rotate in the opposite direction, but the means to obtain this purpose is commonly known and need not therefore be further mentioned here. In the embodiment shown in the drawings said means comprises a suitable reversing switch 29 mounted on the rear side of the back 1 in the upper left corner thereof.

The invalid chair shown in the drawings is, as will appear from the following, so arranged that the switch 14 is automatically closed when the handle 15 is pulled up into its upper position while it is open in all other positions of the handle. This is obtained by means of a mechanism shown in three different positions in Figs. 1, 3 and 4. This mechanism comprises a horizontal shaft 19 rotatably mounted between and journaled on the lower lugs 17 and the back 1 of the chair. This shaft 19 has an arm or a projection 20 to which is pivotally secured one end of a rod 21 the other end of which is pivotally connected to the movable operating member of the switch 14. To the arm or projection 20 is also secured one end of a tension spring 22 the other end of which is secured to a suitable fixed point of the chair. Thus the spring 22 will exert a pull on the rod 21 thereby normally holding the operating member of the switch 14 in its upper position in which the switch is assumed to be open. At the same time the spring 22 will urge the shaft 19 to rotate. Said rotation is, however, restricted by means of a stop 23 mounted at one end of the shaft 19 and which in its normal position as shown in Figs. 2 and 3 engages with the back 1 of the chair thereby relieving the switch of the pull of the spring. Furthermore, to each end of the shaft 19 an angular arm 24 constituting a crank is secured which during the latter part of the upward sliding of the rods 16 engages with said projections 18 and is thereby urged to rotate the shaft 19 against the action of the spring 22 to close the switch 14 this action being clearly shown in Figs. 3 and 4 in the former of which the projections 18 have not quite engaged the arms 24 and rotated the shaft 19 to close switch 14 while in the latter the projections 18 have engaged the arms 19 and depressed the rod 21 to close the switch. When the handle 15 with the rods 16 is again pushed back to its neutral position the spring 22 will pull the shaft 19 back into its initial position thereby opening the switch 14.

Somewhat above the shaft 19 and parallel thereto another shaft 25 is rotatably mounted in the back 1 of the chair or in members secured thereto. The two shafts 19 and 25 are so interconnected that rotation of one shaft in one direction will result in rotation of the other shaft in the opposite direction. Such a connection has in the embodiment shown in the drawings been established by means of a rod 26 the two ends of which are pivotally connected to an arm on each of the two shafts, said two arms projecting to opposite sides of the plane common to the shafts. To the shaft 25 two parallel supporting legs 27 are secured which in the normal position of the shaft, Fig. 3, extend backwards and downwards, while in the position of the shaft corresponding to closed switch, i. e. to wheeling up or down a staircase, they engage the shaft 19 thereby forming a more acute angle with the back of the chair. Moreover, as shown in the drawings the shaft 25 may preferably be used to have the spring 22 secured thereto by means of a strap 28.

If during wheeling of the chair up or down a staircase the assistant for some reason or other lets go the handle 15 the chair will rock backwards but this movement is stopped rather early by the supporting legs which will automatically swing out under the action of the spring to engage the staircase.

The self-locking gearing will make the chair stop instantly when the assistant lets go the handle. To further increase the safety the inner prong of each bifurcated arm 12 has an extension 30 which is so designed as to receive an endless band 31 of a flexible and preferably elastic material. This band 31 is moving in a plane parallel to the plane of the road wheels so as to form a polygon, in the present case a triangle, with curved corners. The sides of the polygon are parallel to the common tangents of the road wheels somewhat inside the latter. The endless bands 31 serve partly to equalize the movements of the two sides of the chair when wheeling up or down a staircase, the bands always striking the edges of the steps, as will appear from Fig. 5, before the road wheels engage the steps, partly by friction against the edges of the steps, to prevent the chair from running out over the edges if the assistant should let go the handle.

In Fig. 6 a mechanism is shown for automatically breaking the road wheels when the invalid chair is adjusted to wheeling up or down a staircase. For clearness' sake this mechanism has not been shown in the other figures. Pivotally mounted on the inner prong of each bifurcated arm 12 is a two-armed lever 32 one arm of which carries a brake block 33 and the other arm of which is actuated by a compression spring 34 which tends to urge the brake block against the road wheel 13. Sliding and freely rotating on the main shaft 10 is a sleeve 35 which at the end opposite the arms 12 has a conical surface 36 which when the sleeve is displaced towards the arms 12, will engage inclined surfaces 37 at the inner ends of the levers 32 and relieve the contact between the brake blocks and the road wheels against the action of the springs 34. In the embodiment shown in the drawings the sleeve 35 is provided at the end thereof remote from the arms 12 with teeth 38 each having an inclined surface 39, said teeth engaging corresponding notches in a member 40 rigidly connected to the frame of the chair. To the free end of an arm 41 on the sleeve 35 one end of a cord or wire 42 is secured the other end of which being secured to one arm 43 of a bell crank lever pivotally mounted in the back of the chair near the vertical slidable rod 16, and in the other arm 44 of which a roller 45 is rotatably mounted which by a spring 46 is urged against the rod 16.

At the place where the roller 45 engages the rod 16 when the latter is in its lower position the rod has a recess 47 to receive the roller. A braking mechanism as above described is preferably provided at both sides of the chair.

In Fig. 6 the brake mechanism is shown in the position assumed during wheeling up and down a staircase and in which the compression spring 34 will urge the brake blocks 33 against the road wheels 13. When after the wheeling up or down a staircase has been finished the rods 16 are pushed downwards into their lower position, the bell crank lever 43, 44 is rotated through a small angle by the spring 46, the roller 45 thereby entering the recess 47 in the rod 16. Through the wire 42 and the arm 41 this rotation is transmitted to the sleeve 35 the teeth 38 of which are thereby partly forced out from the notches in the member 40 by sliding on the inclined surfaces 39. The result will be an axial displacement of the sleeve 35 the conical surface 36 of which will then engage the levers 32 and turn the latter through a small angle against the action of the springs 34 so that the brake blocks are disengaged from the road wheels. As soon as the handle 15 and the rods 16 are raised from their lower position the bell crank lever 43, 44 is again immediately rotated but this time against the action of the spring 46, and the compression spring 34 may now urge the sleeve 35 against the member 40 and force the brake blocks against the road wheels. It shall be noted that the teeth 38 of the sleeve 35 must be sufficiently large so that they cannot be completely disengaged from the notches in the member 40 as otherwise the compression springs would push the sleeve 35 backwards. The brake mechanism will effect an automatic braking of the road wheels when the invalid chair is adjusted to be wheeled up or down a staircase thereby further ensuring that the chair cannot by itself wheel down the staircase.

To enable the adjustment of the chair relatively to the main shaft 10 it may, according to the invention, be preferable to provide the chair with a hand wheel or like operating member (not shown) which is connected to the motor side of the gearing 9.

The invention is not limited to the special embodiment shown and described. Various modifications of the illustrated structure of the chair may be made within the scope of the invention.

I claim:

1. An invalid chair or like vehicle comprising in combination with a chair frame including a seat and back portion, a transverse shaft supported by the frame underneath the seat portion, a motor carrier by the frame, irreversible gearing operatively connecting the motor to the shaft, a multiple armed wheel-supporting spider fixed on each end of the shaft, a wheel rotatively mounted on the outer end of each arm of said spiders, a handle having a depending member slidably supported on the back portion for relative movement up and down, a control switch for the motor mounted on the back portion and biased to normally open position, and switch operating means carried by the depending member on said handle in position to close the switch against its bias in the up position of the handle.

2. An invalid chair or like vehicle comprising in combination with a chair frame including a seat and back portion, a transverse shaft supported by the frame underneath the seat portion, a motor carried by the frame, irreversible gearing operatively connecting the motor to the shaft, a multiple armed wheel-supporting spider fixed on each end of the shaft, a wheel rotatively mounted on the outer end of each arm of said spiders, a handle having a depending member slidably supported on the back portion for relative movement up and down, a control switch for the motor mounted on the back portion, actuating means for the switch, spring means biasing the switch actuating means to normally open position, and means carried by the said depending member in position to engage the actuating means and move the latter means against said spring bias to close the switch on upward movement of the handle.

3. An invalid chair or like vehicle as claimed in claim 2 in which the actuating means include a rotative shaft journaled on the back portion and having a crank arm, a switch actuating rod eccentrically attached to the rotative shaft, and a projection on the depending member adapted to engage the crank arm.

4. An invalid chair or like vehicle comprising in combination with a chair frame including a seat and back portion, a transverse shaft supported by the frame underneath the seat portion, a motor carried by the frame, irreversible gearing operatively connecting the motor to the shaft, a multiple armed wheel-supporting spider fixed on each end of the shaft, a wheel rotatively mounted on the outer end of each arm of said spiders, a handle having a depending member slidably supported on the back portion for relative movement up and down, a normally open control switch for the motor mounted on the back portion, switch operating means carried by the said depending member in position to engage and close the switch at the upward limit of movement of said member, a brake lever for each wheel pivotally carried by the respective spider arm, a spring for each brake lever normally biasing it to braking position, a slidable member adapted to engage and actuate the lever against its bias, and means actuated by the said depending member upon displacement from its downward limit for sliding said slidable member.

5. An invalid chair or like vehicle comprising in combination with a chair frame including a seat and back portion, a transverse shaft supported by the frame underneath the seat portion, a motor carried by the frame, irreversible gearing operatively connecting the motor to the shaft, a multiple armed wheel-supporting spider fixed on each end of the shaft, a wheel rotatively mounted on the outer end of each arm of said spiders, a handle having a depending member slidably supported on the back portion for relative movement up and down, a normally open control switch for the motor mounted on the back portion, switch operating means carried by the said depending member in position to engage and close the switch at the upward limit of movement of said member, a brake lever for each wheel pivotally carried by the respective spider arm, a spring for each brake lever normally biasing it to braking position, a slidable member adapted to engage and actuate the lever against its bias, a spring normally biasing the slidable member into brake lever engaging position, and means controlled by the said depending member operatively connected to the slidable member to move the slidable member against its bias out of brake lever engagement when the handle is raised.

6. An invalid chair or like vehicle as claimed in claim 5 in which the means to move the slidable member against its bias comprise a bell crank lever pivoted on the said back portion and having a roller at one end bearing against the said depending member and urged against said member by said last mentioned spring and having an actuating rod connecting its other end to said slidable member, the depending member having a notch adapted to be engaged by the roller when the handle is down.

7. An invalid chair or like vehicle as claimed in claim 6 in which the slidable member is mounted for rotation and cam means on the slidable member cooperate with fixed cam means to effect sliding movement as the slidable member is rotated, and the said actuating rod is eccentrically connected to the slidable member and effects rotation thereof when the said roller moves into and out of said notch.

8. An invalid chair or like vehicle comprising in combination with a chair frame including a seat and back portion, a transverse shaft supported by the frame underneath the seat portion, a motor carried by the frame, irreversible gearing operatively connecting the motor to the shaft, a multiple armed wheel-supporting spider fixed on each end of the shaft, a wheel rotatively mounted on the outer end of each arm of said spiders, and a flexible endless band mounted upon and connecting the outer ends of said arms of each spider at points radially outside the wheel axles in a plane inside and parallel to that of the wheels of the respective spider.

9. An invalid chair or like vehicle as defined in claim 8 in which the endless band is composed of elastic material.

References Cited in the file of this patent

UNITED STATES PATENTS

| | | |
|---|---|---|
| 1,191,394 | Brown et al. | July 18, 1916 |
| 1,259,064 | Wolff | Mar. 12, 1918 |
| 1,262,806 | Kemble | Apr. 16, 1918 |
| 1,348,568 | Kemble | Aug. 3, 1920 |
| 1,551,127 | Whyel | Aug. 25, 1925 |
| 2,138,239 | Irgens | Nov. 29, 1938 |
| 2,399,605 | Schroeder | Apr. 30, 1946 |
| 2,400,824 | Jackson | May 21, 1946 |
| 2,592,023 | Gleason | Apr. 8, 1952 |
| 2,633,363 | Marshall | Mar. 31, 1953 |
| 2,641,325 | Hoffman et al. | June 9, 1953 |